United States Patent

Hyppänen

[11] Patent Number: 5,910,290
[45] Date of Patent: Jun. 8, 1999

[54] ARRANGEMENT IN A WALL AND A METHOD OF COATING A WALL

[75] Inventor: Timo Hyppänen, Karhula, Finland

[73] Assignee: Foster Wheeler Energia OY, Helsinki, Finland

[21] Appl. No.: 08/793,796

[22] PCT Filed: Sep. 28, 1995

[86] PCT No.: PCT/FI95/00533

§ 371 Date: Mar. 14, 1997

§ 102(e) Date: Mar. 14, 1997

[87] PCT Pub. No.: WO96/10657

PCT Pub. Date: Apr. 11, 1996

[30] Foreign Application Priority Data

Oct. 3, 1994 [FI] Finland ..................... 944587

[51] Int. Cl.[6] ............. F23M 5/08; F23C 11/02; F27B 15/04; B04C 5/085
[52] U.S. Cl. ............. 422/139; 110/263; 427/455
[58] Field of Search ............. 428/614, 937; 427/292, 236, 455, 456, 427, 307, 328; 422/139; 110/336, 264, 263

[56] References Cited

U.S. PATENT DOCUMENTS

| | | | |
|---|---|---|---|
| 2,660,405 | 11/1953 | Scott et al. | 255/347 |
| 3,918,137 | 11/1975 | Telang et al. | 29/156.4 WL |
| 3,988,239 | 10/1976 | Malina | 209/211 |
| 3,989,554 | 11/1976 | Wisler | 285/333 |
| 4,075,376 | 2/1978 | Jaeger | 428/36 |
| 4,273,159 | 6/1981 | Bolton et al. | 138/109 |
| 5,091,156 | 2/1992 | Ijas et al. | 422/146 |
| 5,448,828 | 9/1995 | Willems et al. | 29/899.1 |

FOREIGN PATENT DOCUMENTS

| | | |
|---|---|---|
| 352482 | 1/1990 | European Pat. Off. . |
| 454725 | 5/1988 | Finland . |
| 913314 | 8/1995 | Finland . |
| 4310896 | 3/1994 | Germany . |
| 4328732 | 1/1995 | Germany . |
| 61-170554 | 8/1986 | Japan . |
| 64-32306 | 2/1989 | Japan . |
| 2-185961 | 7/1990 | Japan . |
| 4-198461 | 7/1992 | Japan . |
| 452360 | 2/1986 | Sweden . |
| 1291402 | 10/1972 | United Kingdom . |
| 90-09551 | 8/1990 | WIPO . |

*Primary Examiner*—John J. Zimmerman
*Attorney, Agent, or Firm*—Fitzpatrick, Cella, Harper & Scinto

[57] ABSTRACT

A fluidized bed reactor for combusting material at an elevated temperature and generating heat. The reactor includes an upright reactor chamber delimited by at least one supporting wall having an internally refractory lined lower portion, the reactor chamber defining a space containing an abrading flow of fluidized bed material, a refractory lining provided on the internal side of the lower portion of the supporting wall, a recess provided on the internal side of the supporting wall above the refractory lining, the recess being defined by at least an upper endwall and a bottom, and a coating provided on the internal side of the supporting wall above the refractory lining. The coating extends from the upper endwall of the recess to the refractory lining, for recessing at least an upper border region of the coating.

22 Claims, 4 Drawing Sheets

ARRANGEMENT IN A WALL AND A METHOD OF COATING A WALL

This application was filed under 35 U.S.C 371 from PCT/FI95/00533/ filed Sep. 28, 1995.

BACKGROUND OF THE INVENTION

1. Field of the Invention

The present invention relates to an arrangement in a wall in a fluidized bed reactor. By means of such an arrangement, a very reliable and abrasion-resistant wall is achieved.

The present invention also relates to a method of coating in a fluidized bed reactor a wall. By means of such a method, a long-lasting abrasion-resistant coating for the wall is achieved.

2. Description of the Related Art

The abrasion of various walls is a harmful phenomenon in many industrial applications. Various transport systems, such as pneumatic fuel conveyors and reactors in which various mixtures are treated, are often subjected to abrasion, even hard such abrasion during their operation. Especially gas suspensions containing solids can cause excessive abrasion. The pneumatic transport, for instance, of solid fuel, such as coal and peat, subjects the parts of the transport channels to hard abrasion. Many points of discontinuity, bends or elbows cause local abrasion points in the flow system.

Also, in fluidized bed reactors in which the fluidizing velocity is so high that the reactor functions as a so called circulating fluidized bed reactor, the abrading effect of the circulating material on the walls of the reactor, especially at certain points, has been found to be a serious problem.

Fluidized bed reactors are used in a variety of different combustion, heat transfer, chemical and metallurgical processes. Depending on the process, various bed materials are fluidized and/or circulated in the system. In combustion processes, the fluidized bed consists mainly of particulate fuels, such as coal, coke, lignite, wood, wood waste, coal waste or peat as well as other particulate matter, such as sand, ash, sulphur absorbent, catalysts or metal oxides.

A fluidized bed reactor generating heat comprises an upright reactor chamber having substantially vertical outer walls. The walls are made as waterwalls, i.e., tube walls in which vertical tubes are connected to each other by flat plate material or "fins". The walls in the lower part of the reactor are usually refractory lined so as to withstand heat and erosion. The violent turbulence and abrading effect of the particles and the relatively high density of solid material result in highly erosive conditions, particularly in the bottom part of the reactor.

In certain regions of the reactor, there are both downward and upward flows of bed material. The absolute mass flow varies in radial as well as in axial directions of the reactor chamber. The downward mass flow is at its biggest near the outer wall. As the density of particles increases in the downward direction in the rector chamber, the layer of particles flowing down along the outer walls also thickens. The downward flowing layer can have a thickness of up to 10–50 mm, or even greater. Any change in the flow direction of the downward flowing layer causes erosion.

The upper edge of the refractory lining in the waterwall construction forms a shoulder in the reactor chamber, which causes a vortex in the downward flowing layer of bed material. The direction of the layer flowing vertically downwards along the fins connecting the tubes is partly changed, whereby the layer begins to flow along the edge of the refractory lining. The vortex and the horizontal flow of particles along the edge cause heavy erosion of the waterwall tubes, especially in those parts that are close to the lining. The erosion is in particular problematic in boilers using solid fuel and in which the conditions are highly conducive to erosion.

The tubes in the waterwall have to be inspected from time to time and, if needed, be recoated with protective material or replaced by new tubes. Extensive shutdown time is required to cut off the damaged tubes and to install new ones or to renew the protecting surface. Both alternatives are difficult, expensive and time consuming processes.

While the problem with erosion of tubes in fluidized bed reactors is well known and various solutions have been suggested to minimize erosion, such solutions have not been entirely successful. A lining shielding the tubes higher up in the reactor would decrease the erosion but it would at the same time also decrease the heat transfer to the tubes.

Welding a layer of protective material on the tubes or coating them in some other way in particularly vulnerable regions has been tried. The welds do not, however, last for a very long time in highly erosive surroundings. It has also been suggested to decrease the velocity of the flow along the tube walls by welding studs or other obstacles on the walls, which would decrease the flow rate of the particles along the surface of the tubes. A high velocity enhances, however, the heat transfer at the tube walls and the velocity should, therefore, not be decreased. In published Swedish Patent No. 454,725, it has been suggested to weld curved segments at especially hard wearing locations.

In the arrangement according to published Swedish Patent No. 452,360 the entire reactor walls are inclined inwardly in the upward direction to decrease erosion of the walls. This is a very peculiar construction and not easily accomplished.

In published Finnish Patent Appln. No. 913314 it has been suggested to bend the tube wall outwardly in the downward direction in the region between the uncovered part and the refractory-lined part thereof, at an angle to the vertical plane. The tube wall is then either bent back to the vertical at a distance downwardly from the first bend or it may be bent inwardly at an angle so as to form an inclined inner wall in the combustion chamber. This construction does not form a shoulder, which the lining of the vertical waterwall usually does, wherefore this construction allows a falling layer to flow along the tubes without any vortexes forming in the flow of particles. Bending the tubes first outwardly and then back is a troublesome task and slows down the production process of the boiler wall. In addition, in existing boilers, such an arrangement is both difficult to accomplish and expensive. In rectangular reactor chambers, this arrangement causes additional problems, especially at the corners.

It has been suggested to coat the tube wall of a boiler above the lining of the lower part by metal spraying the tube wall up to a certain level. This has, for instance been suggested in the patent specifications Japanese document No. (JP) 4-198461, Japanese document No. (JP). In these arrangements, the coating will always be to some extent porous by the technique commercially available at present, which increases the susceptibility to abrasion of the coating, especially in the area where it begins, in which either a distinct shoulder is produced or the coating is gradually faded out.

Efforts have been made to decrease the susceptibility to wear by raising the coated area higher and higher in the reactor, where the particle density is smaller than in its lower part and the abrading effect is consequently smaller. This arrangement is, however, very expensive and obviously also increases the heat transfer resistance in a large area.

Another arrangement which has been suggested for increasing the strength of the sprayed coating is to fade out the coating gradually over a relatively long distance so as to prevent the forming of a distinct discontinuity. Even this arrangement has proved to be inadequate. A very thin layer at the beginning of the fading-out section will easily come off from the surface resulting in even greater wearing and loosening.

It has further been suggested in U.S. Pat. No. 3,988,239 a replaceable liner for a cyclone whose inner surface defines a longitudinal passageway through the body. The liner body comprises a hollow bladder with an internal circumferential recess and a generally tubular insert disposed in the recess. The insert defines the greater wear portion of the passageway and is adapted to withstand such greater wear. Preferably the linear material is of flexible nature to facilitate replacement of the wear resistant insert.

SUMMARY OF THE INVENTION

Thus, the prior art has considerable drawbacks. It is, therefore, an object of the present invention to provide a solution to the problems of the prior art.

It is a further object of the present invention to provide a coating arrangement for the tube wall of a fluidized bed reactor and a method which minimizes the erosion of the walls.

It is a further object of the present invention to provide a coating arrangement for the tube wall of a fluidized bed reactor and a method which minimizes the erosion near the refractory lined portions of the walls.

It is a further object of the present invention to reduce the shutdown time caused by the replacement of the tubes in fluidized bed boilers.

It is a further object of the present invention to provide a coating arrangement for a wall in a fluidized bed reactor and a method which minimizes the erosion of the wall. It is still a further object of the present invention to provide a border region of a coating and a wall in a fluidized bed reactor and a method of producing a border region of a coating and a wall which minimizes the risk of the coating coming off.

In order to achieve the above objects in a fluidized bed reactor, the border region of the coating and the wall according to the invention is mainly characterized by the pending apparatus claims. In order to achieve the above objects in a fluidized bed reactor, the method of producing the border region of the coating and the wall according to the invention is mainly characterized by the features set forth in the pending method claims.

According to one aspect of the invention, in such conditions in which there is a space defined by a surface and in which space there is a flow that abrades this surface, the wearing of the surface can be substantially reduced by coating this region with a wear-resistant material. The capability of the material to remain attached to the surface is ensured by a special border region arrangement.

In this application, by the term "supporting surface" is meant such a surface, which defines a surface larger than that covered by the "coating". The supporting surface can, however, differ from a plane surface and be, for instance, a mainly wavelike surface. By the term "coating" is meant such a portion of the "supporting surface", which is afterwards arranged on the "supporting surface" and covers only a portion of the "supporting surface".

It has been found that especially a metal-spraying coating becomes somewhat porous, whereby a very thin layer of coating easily comes off. According to the invention, the coating can advantageously be ended by a border region arrangement in such a way that material is removed in the border region from the supporting surface to a certain depth, thereby forming a recess in the supporting surface, and that the coating is ended in this recessed border region.

According to a preferred embodiment, the border region of the coating and the supporting surface comprises an arrangement in the supporting surface, wherein at the beginning of the coating, a substantially sharp recess from the general plane of the supporting surface is arranged in the supporting surface. The supporting surface in the region of this recess is preferably arranged to return gradually to the general plane of the supporting surface and the coating is arranged to begin at this recess so that the coating at its beginning lies lower or flush with the general plane of the supporting surface. In this way, the beginning of the coating does not form any discontinuity exposed to abrasion and it is, on the other hand, not necessary to make the coating material substantially thinner.

According to a preferred embodiment, the method of forming a border region of the coating and the supporting surface comprises at least the steps of arranging at the beginning of the coating a substantially sharp recess in the supporting surface from the general plane of the supporting surface, arranging the supporting surface to return preferably gradually to the general plane of the supporting surface and arranging the coating to begin at this recess so that the coating at its beginning lies lower or flush with the general plane of the supporting plane.

Another preferred embodiment of the invention relates to a fast fluidized bed reactor, in which the reactor is mainly formed of substantially vertical cooled walls. The lower part of the reactor is refractory-lined so as to shield the cooled walls in the lower part of the reactor. At the end of the lining, above it, is according to the invention a coated region arranged, in which the border region of the coating and the supporting surface, which in this case is the cooled wall of the reactor, comprise an arrangement, in which at the beginning of the coating a substantially sharp recess from the general plane of the supporting surface is arranged in the supporting surface. The supporting surface in the region of the recess is preferably arranged to gradually return to the general plane of the supporting surface, and the coating is preferably arranged to begin at this recess so that the coating at its beginning lies lower or flush with the general plane of the supporting surface. In this way, an abrasion-resistant surface for the cooled wall above the lining is easily achieved.

The further objects, features and advantages of the present invention will be more clearly understood from the following description of the invention and the accompanying drawings.

DESCRIPTION OF THE PREFERRED EMBODIMENTS

Figure 1:
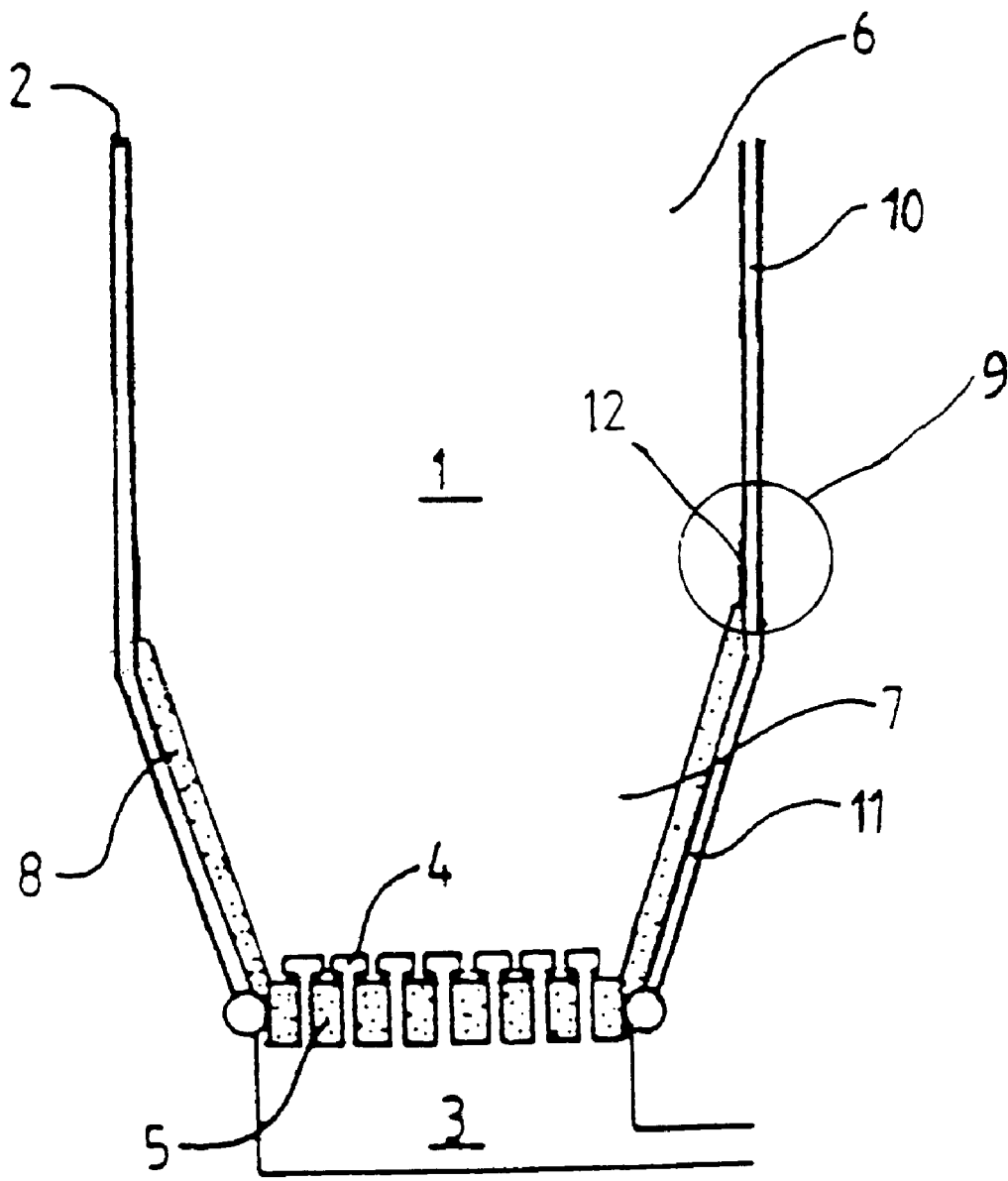
FIG. 1 is a cross-sectional view of the lower part of a fluidized bed reactor.

FIG. 1 shows the lower part of a fluidized bed reactor having a combustion chamber 1 and as peripheral walls tube walls 2, such as membrane walls. The particulate material in the combustion chamber 1 is fluidized by air being introduced from an air chamber 3 beneath the combustion chamber 1. The air is distributed into the combustion chamber 1 from the air chamber 3 through nozzles or apertures 4 in a grid plate 5. If gas other than air is used to fluidize the particulate material, the air or oxidizing gas is introduced through other inlet openings not shown in the figure. Fuel, additives and other particulate material or secondary gas, if needed, are supplied through inlet openings also not shown in the figure.

The waterwalls in the upper part 6 of the combustion chamber 1 are uncovered. In the lower part 7 of the combustion chamber 1, the waterwalls are lined with refractory material 8. In an intermediate zone 9 between the uncovered upper portion 10 of the waterwall and the lined portion 11 of the waterwall, the waterwalls are coated. The height of the refractory lined wall portion is usually 1:3 to 1:10 of the total height of the vertical wall of the combustion chamber.

Figure 2:
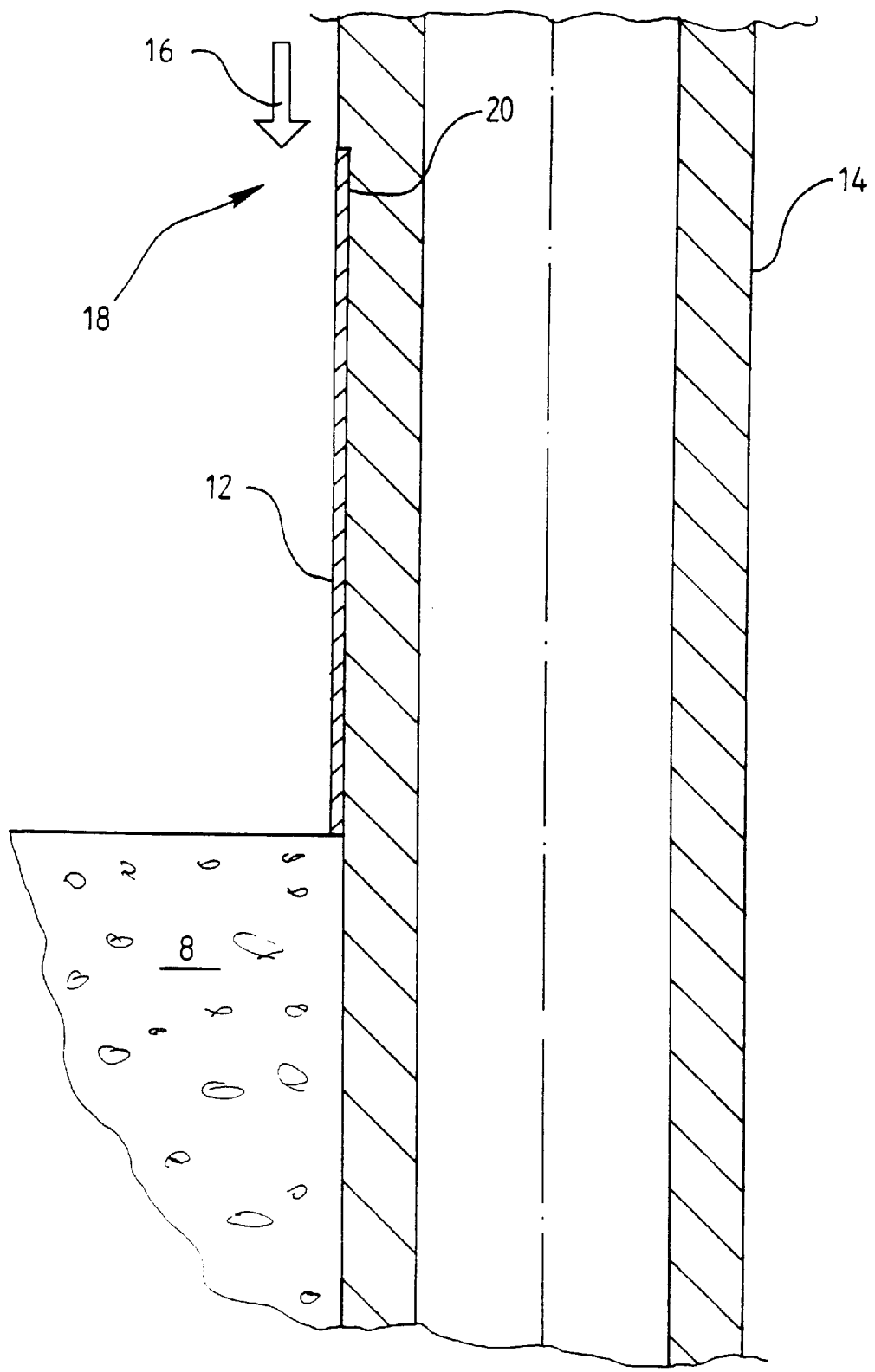
FIG. 2 is an enlarged view of zone 9 of FIG. 1.

The coating 12 is illustrated in more detail in FIG. 2, which is an enlarged view of zone 9 of FIG. 1. FIG. 2 thus shows a portion of a tube wall which is formed of a plurality of tubes, joined together substantially gas tight; usually there are so called fins between the tubes. The coating 12 is arranged to begin on the tube wall 14 immediately above the lining 8. The coating 12 extends over a certain length, usually <0.50 m, preferably <20 cm, above the lining. In fluidized bed reactors, this point of the wall is exposed to abrasion especially by the flow of solids falling down along the wall from above, which flow of solids is indicated by the arrow 16. In this embodiment, the critical point is located especially in the border region 18, where the coating begins.

According to the invention, material is removed in the border region of the coating from the supporting surface, i.e., from the wall 14, to a certain depth and the coating is ended in this border region. Thus, a sharp recess 20 is arranged in the supporting surface or the tube from the general plane of the supporting surface at the beginning of the coating. The recess is thus made in the direction of the abrading flow. The surface of the supporting surface is preferably arranged to return gradually in the region of this recess to the general plane of the supporting surface and the coating is arranged to begin at this recess in such a way that the beginning of the coating lies lower or flush with the general plane of the supporting surface. The border region will then form a substantially continuous surface and a discontinuity exposed to abrasion is not formed. According to the suggested arrangement, the coating 12 can be kept so thick in the whole coated region that its capability to remain attached to the supporting surface is ensured.

The thickness of the coating is generally 0.1–2 mm, but preferably 0.2–0.5 mm, whereby the maximum size of the recess is also 0.5 mm. This is chosen from case to case so that the strength requirement of the tubes 14 will be fulfilled. Portions of the reactor walls can be coated in this way, but preferably, the coated region above the lining 8 encircles the whole reactor and the coating is arranged on all walls. In this figure, only the tube portion of a wall is shown, but naturally also the fins between the tubes are provided with a corresponding coating.

Figure 3:
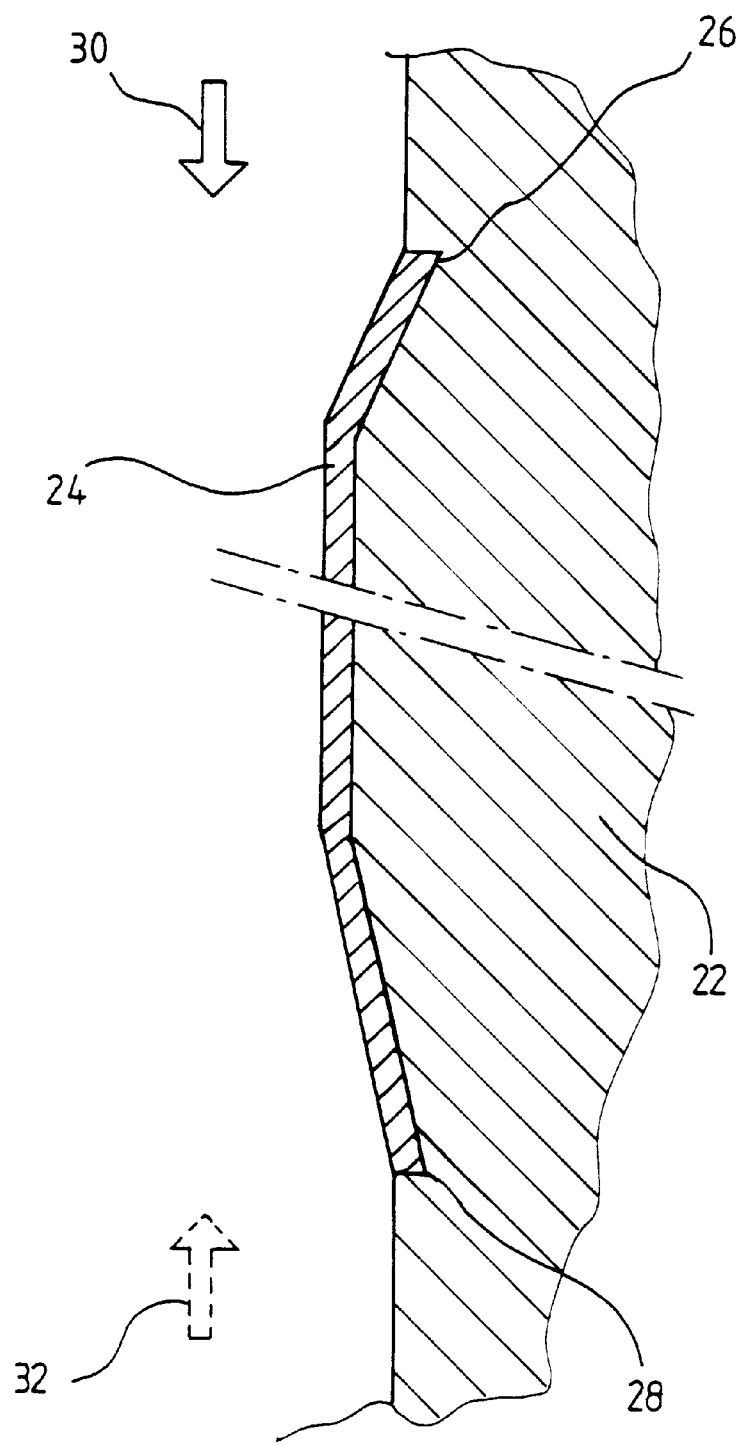
FIG. 3 shows another embodiment of the invention.

FIG. 3 shows a wall 22, which could, for instance, be a portion of a wall construction of a cooled cyclone for a fluidized bed reactor. Certain regions of the cyclone wall of the reactor, for instance, according to Finnish patent No. 86964, are exposed to abrasion by the flow of separated solids. In this embodiment, a coating 24 is recessed in the wall 22 in two regions. Both the upper and lower end of the coating 24 end in recesses 26 and 28 arranged according to the invention into the supporting surface, such that the surfaces of both ends of the coating lie about flush with the general plane of the supporting surface in these regions. The coating is recessed in two locations, because an abrading flow is assumed to take place in the direction "from the supporting surface to the coating" both in the first border region, arrow 30, and in the second border region, arrow 32. In this way, the thickness of the coating will be sufficient to ensure that the coating remains attached to the supporting surface 22 at all such border regions where the abrading flow comes from an uncoated supporting surface to a coating. Even in this case, the thickness of the coating is preferably 0.2–0.5 mm.

Figure 4:
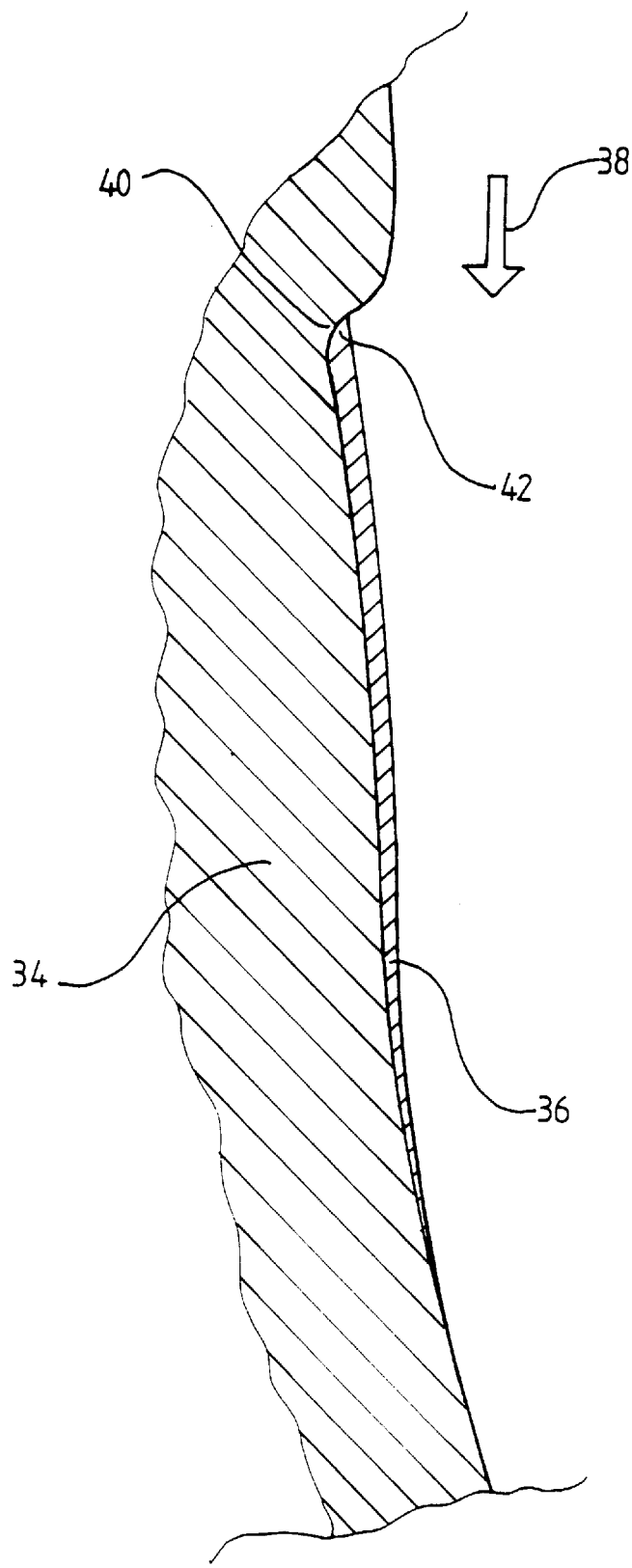
FIG. 4 shows still another embodiment of the invention.

FIG. 4 shows another embodiment of the invention, wherein a portion of the wall 34 of a conveyor channel for solid fuel, for instance, serves as the supporting surface for a coating 36. In this case, the main flow direction of the abrading flow is known a nd indicated by the arrow 38. In this embodiment of the invention, the border region 40 between the coating 36 and the supporting surface 34 is located in a bent portion of the supporting surface, the bend forming the recess 42. The recess 42 has in this embodiment a rounded form and the coating layer begins below the first bend. The particulate (fuel) layer or suspension flowing along the all (arrow 38) glides forward after having touched the coating after the border region 40.

In the embodiment according to FIG. 4, the flowing (fuel) articles continue to flow without any violent turbulence which would cause erosion in the border-region of the coating. In this embodiment, the thickness of the coating can be chosen more freely. The coating layer begins preferably below the bend, at a location in which the surface of the supporting surface after the bending point of the recess is flush with the general plane of the supporting surface after the bend. The particles flowing here do not cause erosive turbulence in the border region between the supporting surface and the coating. An arrangement corresponding to that of FIG. 4 can also be used in the zone 9 of FIG. 1, because even there, the direction of the abrading flow is known and the lower part of the coating is bordered by the lining.

According to the invention it is possible to provide a thickness of the coating which is sufficient to ensure that the coating remains attached to the supporting surface 34 in all such border regions where an abrading flow comes from an uncoated supporting surface to a coating. The end part of the coating 36 in the direction of the flow, i.e., the rear end, is arranged to gradually fade out. At the rear end, this arrangement does not cause any trouble, as the direction of the abrading flow is from the coating to the uncovered supporting surface.

In a circulating bed reactor, there are also other regions in which the abrasion effect of the circulating material reduces the usability of the reactor. Also, in pressurized fluidized bed reactors, the present invention is of great advantage.

The invention is not limited to the embodiments described and illustrated above, but can be varied in many ways within the scope of the invention, which is defined in the appended claims.

I claim:

1. A fluidized bed reactor for combusting material at an elevated temperature and generating heat, said reactor comprising:

an upright reactor chamber delimited by at least one supporting wall having an internally refractory lined lower portion, said reactor chamber defining a space containing an abrading flow of fluidized bed material;

a refractory lining provided on the internal side of the lower portion of the supporting wall;

a recess provided on the internal side of the supporting wall above said refractory lining, said recess being defined by at least an upper endwall and a bottom; and a coating provided on the internal side of the supporting wall above said refractory lining, said coating extending from the upper endwall of said recess to the refractory lining, for recessing at least an upper border region of said coating.

2. A fluidized bed reactor according to claim 1, wherein an upper beginning region of said coating is at most flush with a surface plane of the supporting wall.

3. A fluidized bed reactor according to claim 1, wherein the upper endwall of said recess is substantially orthogonal to the supporting wall.

4. A fluidized bed reactor according to claim 1, wherein the upper endwall of said recess is inclined with respect to a plane orthogonal to the supporting wall.

5. A fluidized bed reactor according to claim 1, wherein said coating includes a metal-sprayed erosion-resistant coating.

6. A fluidized bed reactor according to claim 1, wherein said coating has a substantially constant thickness.

7. A fluidized bed reactor according to claim 2 wherein said coating has a thickness of about 0.1 to about 2 mm.

8. A fluidized bed reactor according to claim 1, wherein said coating has a thickness of about 0.2 to about 0.5 mm.

9. A fluidized bed reactor according to claim 1, wherein the supporting wall comprises a water cooled tube wall construction.

10. A fluidized bed reactor system for combusting material at an elevated temperature and generating heat, said reactor system comprising:

a space delimited by a supporting wall and containing an abrading flow of material;

at least one recess provided on the internal side of the supporting wall, said at least one recess being defined by a first endwall and a bottom; and a coating provided on the internal side of the supporting wall, said coating having a first end and a second end, the first end of said coating extending from the first endwall of said at least one recess along said at least one recess, for recessing at least the first end region of the coating, said coating including a metal-sprayed erosion-resistant coating.

11. A fluidized bed reactor according to claim 10, wherein a second recess is provided on the internal side of the supporting wall, said second recess being defined by a second endwall and a bottom in a direction extending from the second endwall toward the first endwall of said at least one recess, said coating extending from the first endwall of said at least one recess to the second endwall of said second recess, for recessing at least the first and second end regions of said coating, and the first and second ends of said coating being at most flush with a surface plane of the supporting wall.

12. A fluidized bed reactor system according to claim 10, wherein the supporting wall delimits a cyclone separator.

13. A fluidized bed reactor system according to claim 10, wherein the supporting wall delimits a fuel transporting channel.

14. A fluidized bed reactor system according to claim 10, wherein the first endwall of said at least one recess is orthogonal to the supporting wall.

15. A fluidized bed reactor system according to claim 10, wherein said coating has a substantially constant thickness.

16. A fluidized bed reactor according to claim 10, wherein said coating has a thickness of about 0.1 mm to about 2 mm.

17. A fluidized bed reactor system for combusting material at an elevated temperature and generating heat, said reactor system comprising:

a gas space delimited by a supporting wall and containing an abrading flow of material;

a recess provided on the internal side of the supporting wall, said recess being defined by at least a first endwall and a bottom, a bend in the supporting wall forming the first endwall and said recess extending from the at least first endwall in the direction of flow of the abrading material; and a coating provided on the internal side of the supporting wall, said coating having a first end and a second end, said coating extending from the first endwall of said recess in the direction of flow of the abrading material, at least the first end of said coating being recessed in the first endwall region of the recess, and said coating including a metal-sprayed erosion-resistant coating.

18. A fluidized bed reactor system according to claim 17, wherein said coating has a diminishing thickness in the flow direction of the abrading material.

19. A method of producing an erosion-resistant supporting wall for a fluidized bed reactor, which combusts material at an elevated temperature and generates heat, said method comprising:

providing a supporting wall, the supporting wall delimiting a space containing an abrading flow of fluidized bed material;

providing a refractory lining on the internal side of a lower portion of the supporting wall;

providing a recess on the internal side of the supporting wall above the refractory lining, the recess being defined by at least an upper endwall and a bottom; and providing a coating on the internal side of the supporting wall above the refractory lining, the coating extending from the upper endwall of the recess to the refractory lining.

20. A method according to claim 19, wherein the coating includes a metal-sprayed erosion-resistant coating.

21. A method according to claim 19, wherein the coating extends over a length of less than about 0.50 meter above the beginning of the refractory lined lower portion of the supporting wall.

22. A method according to claim 19, wherein the coating has a substantially constant thickness of about 0.1 mm to about 2 mm.

* * * * *